United States Patent
Bastholm

(10) Patent No.: US 7,847,494 B2
(45) Date of Patent: Dec. 7, 2010

(54) DRIVE UNIT, PREFERABLY AN ACTUATOR, A CONTROL AND A CONSTRUCTION

(75) Inventor: Jeppe Bastholm, Sønderborg (DK)

(73) Assignee: Linak A/S, Nordborg (DK)

(*) Notice: Subject to any disclaimer, the term of this patent is extended or adjusted under 35 U.S.C. 154(b) by 0 days.

(21) Appl. No.: 10/511,728

(22) PCT Filed: Apr. 16, 2003

(86) PCT No.: PCT/DK03/00260

§ 371 (c)(1),
(2), (4) Date: Jan. 19, 2005

(87) PCT Pub. No.: WO03/090336

PCT Pub. Date: Oct. 30, 2003

(65) Prior Publication Data

US 2005/0116668 A1    Jun. 2, 2005

(30) Foreign Application Priority Data

Apr. 19, 2002   (DK) ................. 2002 00581
Apr. 19, 2002   (DK) ................. 2002 00589
Apr. 19, 2002   (DK) ................. 2002 00595

(51) Int. Cl.
  *H02P 1/54*    (2006.01)
  *H02P 5/00*    (2006.01)
  *H02P 5/46*    (2006.01)

(52) U.S. Cl. ................ 318/34; 318/53; 318/66

(58) Field of Classification Search ............ 318/34, 318/53, 66

See application file for complete search history.

(56) References Cited

U.S. PATENT DOCUMENTS

| | | | | |
|---|---|---|---|---|
| 4,388,572 A | * | 6/1983 | Rosenfeldt | ............ 388/833 |
| 4,736,151 A | | 4/1988 | Dishner | |
| 5,291,382 A | | 3/1994 | Cohen | |
| 5,321,342 A | * | 6/1994 | Kruse | ............ 318/254 |
| 5,378,975 A | * | 1/1995 | Schweid et al. | ............ 318/685 |
| 5,652,825 A | * | 7/1997 | Schmider et al. | ............ 388/822 |
| 5,982,156 A | * | 11/1999 | Weimer et al. | ............ 323/222 |
| 6,037,755 A | | 3/2000 | Mao et al. | |
| 6,121,768 A | * | 9/2000 | Taurand | ............ 324/117 R |
| 6,343,021 B1 | * | 1/2002 | Williamson | ............ 363/8 |
| 6,370,050 B1 | * | 4/2002 | Peng et al. | ............ 363/98 |
| 6,509,705 B2 | * | 1/2003 | Bastholm et al. | ............ 318/434 |
| 6,762,577 B2 | * | 7/2004 | Gray et al. | ............ 318/268 |
| 2002/0030457 A1 | | 3/2002 | Bastholm et al. | |
| 2004/0012356 A1 | * | 1/2004 | Makaran et al. | ............ 318/442 |
| 2004/0201279 A1 | * | 10/2004 | Templeton | ............ 307/11 |

* cited by examiner

*Primary Examiner*—Bentsu Ro
*Assistant Examiner*—Erick Glass
(74) *Attorney, Agent, or Firm*—Dykema Gossett PLLC

(57) ABSTRACT

In particular in articles of furniture having at least an element which may be adjusted with a DC motor, preferably via a mechanical transmission, it is desirable to have a level of acoustic noise as low as possible. The power supply to the DC motor is based on a transformer with rectification and smoothing. With the invention it has surprisingly been found that the level of acoustic noise may be reduced significantly in that the secondary side of the transformer has a first control to compensate for the loss in the motor, thereby keeping the speed thereof constant for a long period of time, and a second control adapted to remove the ripple in the voltage, thereby keeping the speed of the motor constant for a short period of time.

3 Claims, 4 Drawing Sheets

Back    $V_{out} = V_{in}\,\text{duty cycle}$

Boost    $V_{out} = V_{in}\dfrac{1}{\text{duty cycle}}$

DRIVE UNIT, PREFERABLY AN ACTUATOR, A CONTROL AND A CONSTRUCTION

BACKGROUND OF THE INVENTION

1. Field of the Invention

The present invention relates to a drive unit for moving parts of articles of furniture.

2. The Prior Art

Actuators driven by a reversible low volt DC motor, typically 24V, are used for adjustable articles of furniture, such as beds, chair and tables. In a linear actuator, the motor, via a transmission, drives a spindle having a nut fixed against rotation so that the nut can move to and fro on the spindle depending on the direction of rotation of the spindle. The nut has arranged thereon a tubular rod whose free end is provided with an attachment for securing in the structure. Typically, the transmission simply consists of a worm gear, where the worm is provided in an extension of the motor shaft and the worm wheel secured directly on the spindle. An example is disclosed in WO 02/29284 to Linak A/S. A special structure of linear actuators is called lifting columns, e.g. intended for table legs. Rotary actuators have so far not been as common as linear actuators in connection with furniture, but a single example based on a specially constructed planetary gear is described in WO 01/17401 to Linak A/S. Also known are other forms of drive units constructed specifically for use in furniture. In the furniture business, the price of the actuators is a decisive factor, which has become particularly pronounced recently. This, of course, has resulted in a development toward simpler structures. Thus, it may be mentioned that for cost-reducing purposes the power supply is dimensioned in view of the circumstance that it is loaded only briefly when the article of furniture is adjusted. Or put differently, it is allowed to overload the power supply briefly. For example, in case of a height-adjustable table which may be adjusted from 650 mm to 1250 in the height, it takes 12 seconds to get from one extreme position to the other at a speed of 50 mm/sec. To avoid continuous overload operation, running is just allowed for a given interval of time so that the power supply is not superheated.

Especially in the furniture business, a decisive aspect is the level of noise, and with a demand for less expensive actuators it is even more difficult to meet the requirement for low-level noise actuators.

During adjustment of the article of furniture mechanical noise occurs, such as transmission noise, noise in the suspension of the adjustable element, noise because of vibrations that propagate in the structure, etc. When the most powerful single sources of noise have been remedied, it is a complex noise picture that emerges, it being very difficult, if not impossible, to locate the individual sources of noise.

In case of furniture, the level of noise is a significant factor in the sense that this must be as low as possible. This applies to beds, including hospital beds and sickbeds, as well as armchairs and tables, including desks. In the furniture structure and in the drive unit, various common noise-reducing measures may be taken, such as the use of rubber/plastics suspensions, plastics bushings, lubricants, etc. to counteract the noise, but in spite of this it is still desirable to reduce the level of noise additionally.

Some of the noise originates from the motor, where part of the noise is caused by the structure of the rotor with axis-parallel air gaps between the iron flanges on which the coils are wound. This gives small, but noticeable discontinuities in the magnetic field that cause vibrations which propagate in the structure and cause acoustic noise. To obviate the discontinuity, it has been proposed to twist the armature so that the air gap is not axis-parallel. The phenomenon is described in another connection in U.S. Pat. No. 4,616,151.

Another part of the noise from the motor is caused by an axial movement of the rotor, which likewise results in vibrations and thereby acoustic noise. Owing to manufacturing tolerances it is difficult to do anything about the problem. The phenomenon is also described in another connection inter alia in U.S. Pat. No. 5,497,039 and in U.S. Pat. No. 6,069,422, both of which propose solutions for fixing the rotor in the axial direction via the magnetic fields of the stator.

Another aspect of the acoustic noise is the transmission noise, part of which originates from the engagement between the gear wheels or more particularly the varying degree of the engagement. In this context, reference may be made to WO 01/94732 A1 to VKR Holding A/S, which addresses noise problems in relation to window openers, focus being on noise caused by clearance between the components of the transmission, it being attempted to reduce the noise by controlled engagement between a worm and a worm wheel.

The outlined solutions are expensive and complicated or cannot readily be implemented in the present connection.

The invention is based on an ever increasing wish for reducing the noise level of linear actuators, bearing in mind that this must not lead to increased or appreciably increased costs of these.

SUMMARY OF THE INVENTION

By the invention it has surprisingly been found by chance that the general level of acoustic noise may be reduced significantly by purely electrical means. This is brought about according to the invention by constructing a drive unit which includes a DC motor having a rotor with a plurality of coils connected to a commutator in connection with a set of brushes to establish a voltage across the coils, the DC motor, via a transmission, driving an adjustment means for adjusting an adjustable element in a structure in which the drive unit is incorporated, the drive unit being supplied with power from a power supply including a transformer having a primary side for connection to a mains voltage (alternating current) and a secondary side with rectification and smoothing for connection to the DC motor, with a first control to compensate for the loss in the motor and with a second control adapted to remove variations in the voltage, thereby keeping the speed of the motor constant for a long period of time as well as for a short period of time.

There is no evident explanation to the phenomenon, but a possible explanation is that the reason is the reduction in the variation of the moment supplied by the motor, thereby producing a more constant engagement of the individual parts of the transmission. This, in turn, leads to smaller vibrations in the motor and the transmission as well as the structure as a whole, and thereby the acoustic noise is reduced.

It is possible to use various means for realizing the first control to compensate for the loss in the motor. Here, mention may be made indiscriminately of pseudo motors (used e.g. in WO 02/03526 to Linak A/S for synchronous running of two or more DC motors, where the principle in the pseudo motor is shown in FIG. 3 and described on page 8, line 15 ff, hereby incorporated by reference in the present application), locking to commutator noise, generators having a predetermined frequency and control loop or Hall sensors. With the finding of the invention it is within the skills of a person skilled in the field to apply these solutions and similar solutions to achieve the intended effect.

A particularly favourable embodiment of the second control adapted to remove the ripple in the voltage is characterized in that the smoothing is performed by the following two steps, viz. a forward step and a power step, where the forward step may be described as the input voltage $V_{in}$ from the rectification and a constant which is given by the actual embodiment of the circuits for the two steps. The power step may be described by its output voltage $V_{out}$ and the input voltage $V_{in}$ and the duty cycle which is the proportional time for which the power supply may be loaded during a given period of time. The result of the two steps gives $V_{out}=k$, i.e. the smoothed voltage is constant. This structure is entirely or practically entirely free of ripple voltage and simultaneously has a high efficiency and is moreover simple and inexpensive.

When long and short periods of time are mentioned, this should of course be seen in relation to the given adjustments, where an example of a long period of time is 30 msec. to 1 sec., while a short period of time is less than 10 msec., viz. the reciprocal of 100 Hz.

With the finding of the invention it is realized that the second control may basically consist of a capacitor having a great capacity exclusively with the purpose of removing variations in the voltage. This is a simple solution having a high efficiency, but the price is high, and ripple is not removed entirely. In addition, the physical size of the capacitor is a problem.

Another possibility is a linear control which is characterized by a low-cost, ripple-free and simple structure, but the power loss is quite great.

A further possibility is switch mode, which is favourable in that it is ripple-free and has a high efficiency. However, the structure is complex and the price is high.

Examples of the preferred control for removing the ripple in the voltage as well as a couple of noise measurements will be described below with reference to the accompanying drawings.

DETAILED DESCRIPTION OF THE PREFERRED EMBODIMENTS

The first example is a Buck circuit, which may be expressed by $V_{out}=V_{in}\cdot$duty cycle. The corresponding forward step must be duty cycle=$k/V_{in}$. The result is then $V_{out}=k$.

The next example is a boost circuit, which may be expressed by $V_{out}=V_{in}/$duty cycle. The corresponding forward step must be duty cycle=$V_{in}/k$. The result is then again $V_{out}=k$.

The third example is a flyback circuit, which resembles the preceding one, but with the opposite sign $V_{out}=-V_{in}/$duty cycle. The same forward step as before may be used, viz. duty cycle=$V_{in}/k$, which gives $V_{out}=-k$.

Figure 1A:
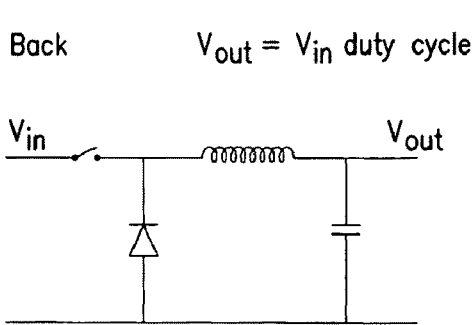
FIG. 1a shows a first example of a power step.
Figure 1B:
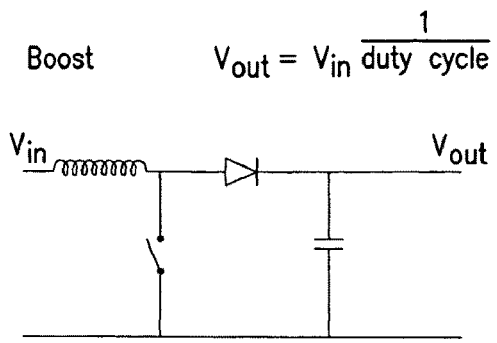
FIG. 1b shows a second example of a power step.
Figure 1C:
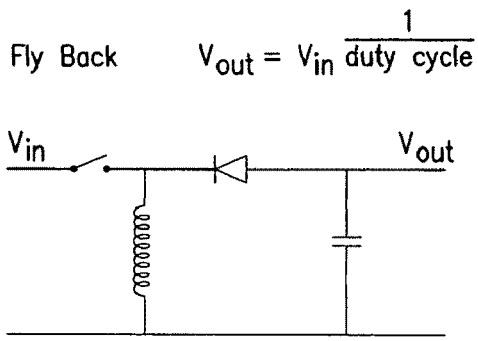
FIG. 1c shows a third example of a power step.
Figure 2:
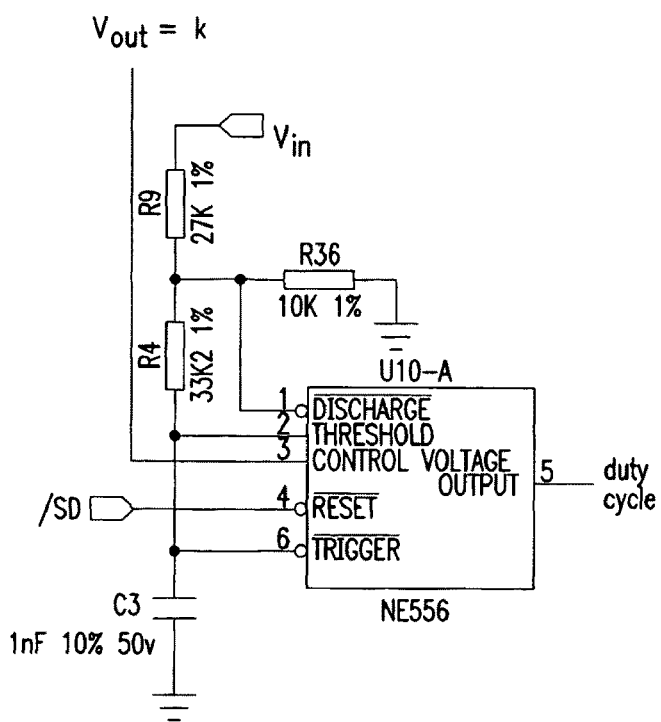
FIG. 2 shows an example of a forward step.

FIG. 2 shows a forward step which may be used in connection with all three examples of power steps, with just a dimensional adaptation to the examples shown. It is seen to include an NE556 astable timer having a duty cycle directly controlled by output voltage with adjustments from input voltage.

It will be appreciated that the invention is not limited to the mentioned circuits, and that other circuits fulfilling the function, as stated in the claims, are just as suitable.

Figure 3:
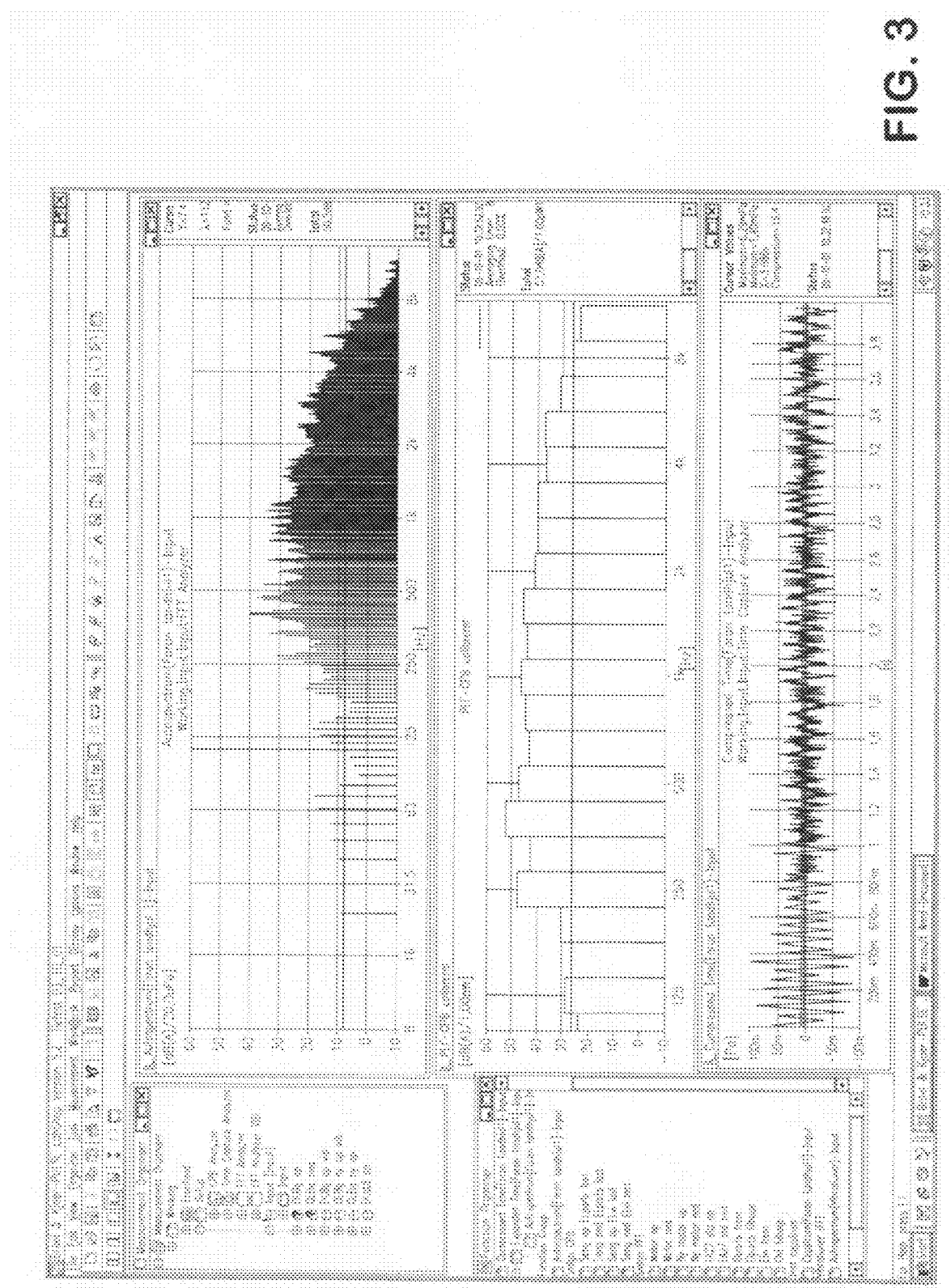
FIG. 3 shows a noise measurement performed on a lifting column with a common power supply.
Figure 4:
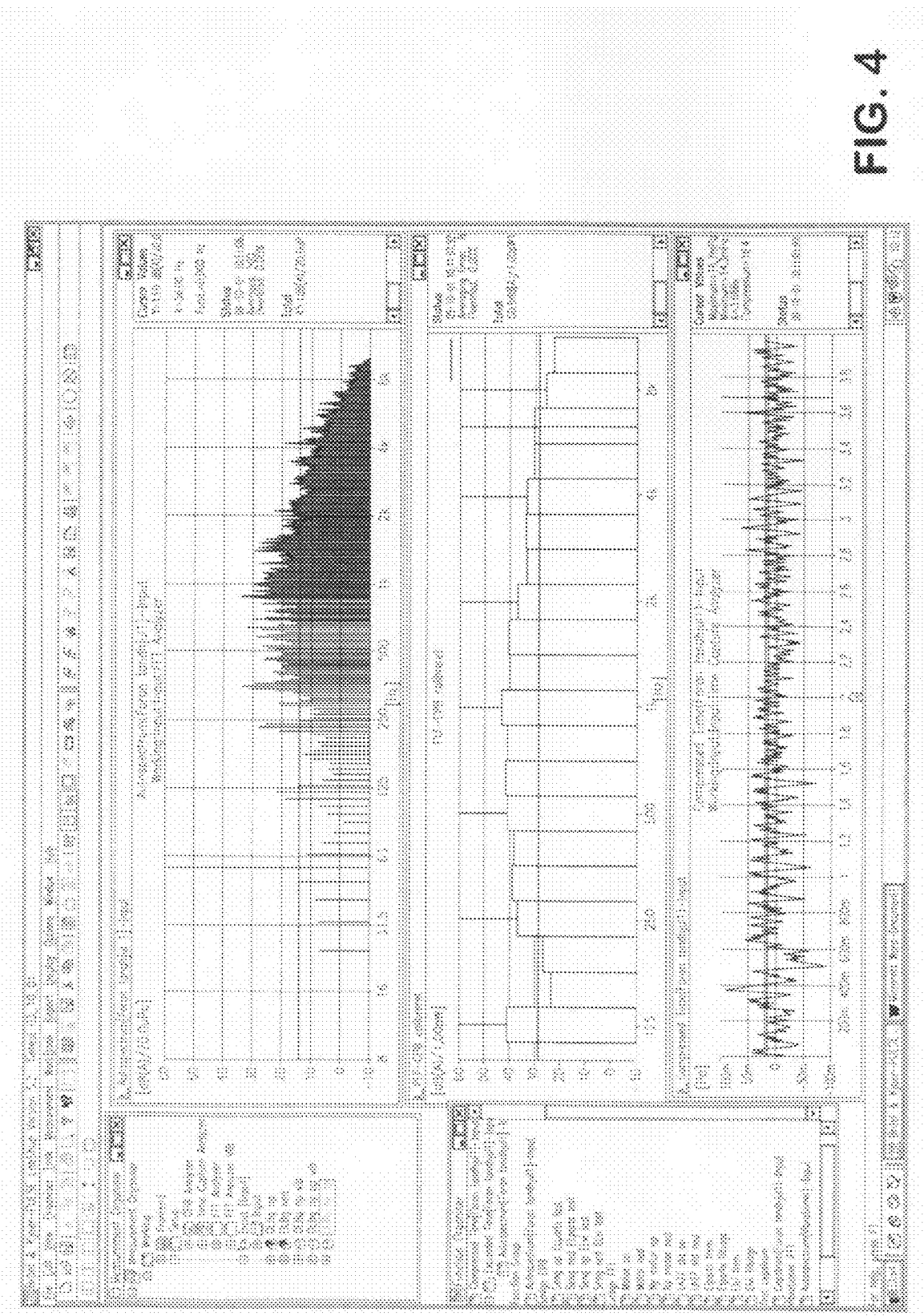
FIG. 4 shows a noise measurement on the same lifting column and power supply, but designed in accordance with the invention.

To illustrate the effect of the invention, reference is made to the results of two noise measurements, where FIG. 3 shows a noise measurement made on a lifting column having a common power supply, i.e. transformer, rectification and smoothing with capacitor (in the present case a lifting column having the designation DL1 and a control box having the designation CBD1 of the make Linak A/S). FIG. 4 shows a noise measurement of the lifting column and power supply, but designed in accordance with the invention (in the present case a lifting column having the designation DL1 and a control box CBD4 of the make Linak A/S). As will appear from the curves, there is a significant decline in the noise, totally from 57.0 dB(A) to 50.6 dB(A).

Figure 5:
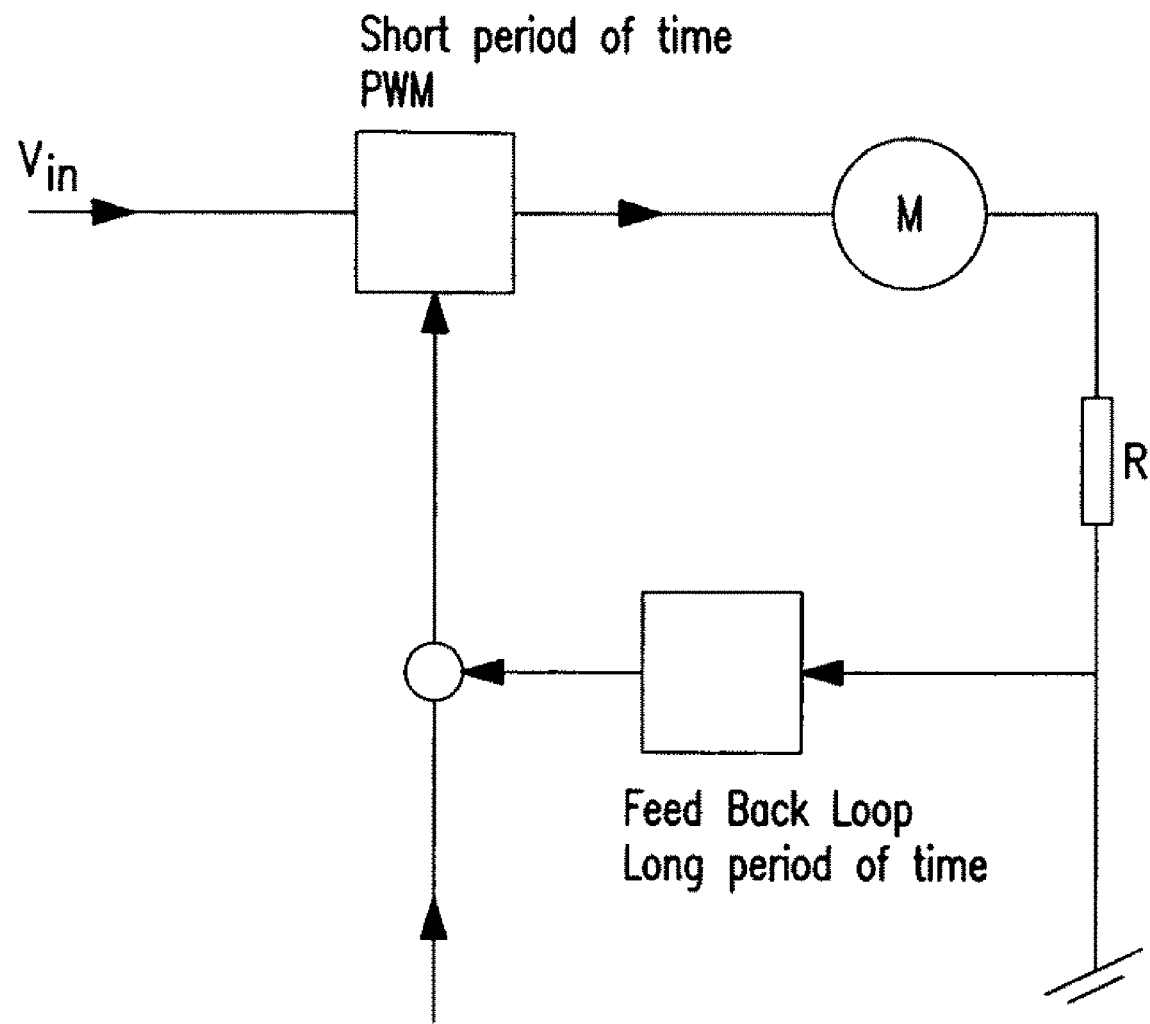
FIG. 5 shows a presentation of the embodiment when the second control removes ripples in the voltage so as to maintain the speed of the motor constant for a shorter duration than the time period the first control keeps the motor speed constant by compensating for loss in the motor.

FIG. 5 shows a presentation of when the second control maintains the speed of the motor constant for a shorter time period than that of the first control.

Although the invention has been explained in the foregoing with respect to articles of furniture in the broadest sense, the invention is not restricted to this, of course. In industrial and construction applications or applications in means of transportation there may also be a requirement for a low level of acoustic noise.

The invention claimed is:

1. A drive unit comprising a DC motor having a rotor consisting of a plurality of coils connected to a commutator in connection with a set of brushes to establish a voltage across the coils, said DC motor, via a transmission, driving an adjustment means for adjusting an adjustable element in a structure in which the drive unit is incorporated, a power supply for driving said drive comprising a transformer having a primary side for connection to a mains voltage (alternating current) and a secondary side with rectification and smoothing for connection to the DC motor, a first control means to compensate for loss in the motor, thereby maintaining a speed thereof constant for a first period of time, a second control means that removes ripples in the voltage, thereby maintaining the speed of the motor constant for a second period of time, said second period of time being shorter in duration than said first period of time, and including an astable timer having a duty cycle which is controlled by output voltage and adjusted by input voltage, and wherein said first period of time is 30 msec. to 1 sec. and said second period of time is less than 10 msec.

2. A drive unit comprising a DC motor having a rotor consisting of a plurality of coils connected to a commutator in connection with a set of brushes to establish a voltage across the coils, said DC motor, via a transmission, driving an adjustment means for adjusting an adjustable element in a structure in which the drive unit is incorporated, a power supply for driving said drive comprising a transformer having a primary side for connection to a mains voltage (alternating current) and a secondary side with rectification and smoothing for connection to the DC motor, a first control means to compensate for loss in the motor, thereby maintaining a speed thereof constant for a first period of time, a second control means that removes ripples in the voltage, thereby maintaining the speed of the motor constant for a second period of time, said second period of time being shorter in duration than said first period of time, and including an astable timer having a duty cycle which is controlled by output voltage and adjusted by input voltage, wherein the second control means provides a forward step in which a duty cycle is expressed by k and $V_{in}$, and a power step in which $V_{out}$ is expressed by $V_{in}$ and the duty cycle, wherein the result of the forward step and the power step is $V_{out}=K$, and wherein $V_{in}$ is an input voltage from the rectification, $V_{out}$ is an output voltage from the power step, k is a constant given by actual circuits for the forward step and the power step, and wherein the duty step is the proportional time for which the power supply is loaded during a given period of time, wherein the forward step is given by duty cycle=$K/V_{in}$, and the power step by $V_{out}=V_{in}$*duty cycle.

3. A drive unit comprising a DC motor having a rotor consisting of a plurality of coils connected to a commutator in connection with a set of brushes to establish a voltage across the coils, said DC motor, via a transmission, driving an adjustment means for adjusting an adjustable element in a structure in which the drive unit is incorporated, a power supply for driving said drive comprising a transformer having a primary side for connection to a mains voltage (alternating current) and a secondary side with rectification and smoothing for connection to the DC motor, a first control means to compensate for loss in the motor, thereby maintaining a speed thereof constant for a first period of time, a second control means that removes ripples in the voltage, thereby maintaining the speed of the motor constant for a second period of time, said second period of time being shorter in duration than said first period of time, and including an astable timer having a duty cycle which is controlled by output voltage and adjusted by input voltage, wherein the second control means provides a forward step in which a duty cycle is expressed by k and $V_{in}$, and a power step in which $V_{out}$ is expressed by $V_{in}$ and the duty cycle, wherein the result of the forward step and the power step is $V_{out}=K$, and wherein $V_{in}$ is an input voltage from the rectification, $V_{out}$ is an output voltage from the power step, k is a constant given by actual circuits for the forward step and the power step, and wherein the duty step is the proportional time for which the power supply is loaded during a given period of time, wherein the forward step is given by duty cycle=$V_{in}/k$, and the power step by $V_{out}=V_{in}$/duty cycle.

* * * * *